(12) United States Patent
Kustermann

(10) Patent No.: US 6,202,557 B1
(45) Date of Patent: *Mar. 20, 2001

(54) APPLICATOR SYSTEM ROLL

(75) Inventor: Martin Kustermann, Heidenheim (DE)

(73) Assignee: Voith Sulzer Papiermaschinen GmbH, Heidenheim (DE)

(*) Notice: Subject to any disclaimer, the term of this patent is extended or adjusted under 35 U.S.C. 154(b) by 0 days.

This patent is subject to a terminal disclaimer.

(21) Appl. No.: 09/418,766

(22) Filed: Oct. 15, 1999

Related U.S. Application Data

(63) Continuation of application No. 09/014,774, filed on Jan. 28, 1998, now Pat. No. 5,967,035.

(30) Foreign Application Priority Data

Jan. 30, 1997 (DE) ............................................. 297 01 547

(51) Int. Cl.[7] .................................................. B41F 13/10
(52) U.S. Cl. ................. 101/376; 492/50; 492/52
(58) Field of Search ......................... 101/375, 348, 101/380.3, 352.06, 351.7, 219, 217, 376; 492/17, 50–52, 16, 30, 7; 118/224, 227, 249, 228, 116, 118; 428/36.3, 36.2, 36.1; 29/402.08

(56) References Cited

U.S. PATENT DOCUMENTS

| | | | |
|---|---|---|---|
| 3,707,752 * | 1/1973 | Brafford et al. | 492/52 |
| 3,757,398 * | 9/1973 | Urban | 492/7 |
| 4,043,013 * | 8/1977 | Zeppernick et al. | 492/52 |
| 4,224,095 | 9/1980 | Giori | 156/215 |
| 4,368,568 * | 1/1983 | Watanabe | 492/52 |
| 4,509,426 | 4/1985 | Hardin | 101/348 |
| 4,576,845 * | 3/1986 | Krotchko | 428/36.1 |
| 4,913,943 * | 4/1990 | Goosen | 428/36.1 |
| 4,920,627 * | 5/1990 | Aikns et al. | 429/402.08 |
| 5,061,533 * | 10/1991 | Gomi et al. | 428/36.3 |
| 5,324,248 * | 6/1994 | Quigley | 492/50 |
| 5,386,771 * | 2/1995 | McCartney et al. | 101/148 |
| 5,387,172 * | 2/1995 | Habenicht et al. | 492/50 |
| 5,429,051 | 7/1995 | Laubscher | 101/417 |
| 5,547,448 * | 8/1996 | Robertson | 492/16 |
| 5,598,777 | 2/1997 | DeMoore et al. | 101/177 |
| 5,660,109 | 8/1997 | Constantino et al. | 101/348 |
| 5,752,444 | 5/1998 | Lorig | 101/375 |
| 5,857,950 * | 1/1999 | Hycner | 492/30 |

FOREIGN PATENT DOCUMENTS

| | | |
|---|---|---|
| 1 924 635 | 11/1970 | (DE). |
| 32 28 002 | 4/1986 | (DE). |
| 35 25 045 | 1/1987 | (DE). |
| 40 22 334 | 1/1992 | (DE). |
| 41 19 824 | 12/1992 | (DE). |
| 94 08 276 | 10/1994 | (DE). |
| 43 19 622 | 12/1994 | (DE). |
| 44 21 310 | 12/1995 | (DE). |
| 295 18 150 | 2/1996 | (DE). |
| 296 09 007 | 8/1996 | (DE). |
| 195 10 227 | 9/1996 | (DE). |
| 0 466 007 | 1/1995 | (EP). |

* cited by examiner

Primary Examiner—Eugene Eickholt
(74) Attorney, Agent, or Firm—Taylor & Aust, P.C.

(57) ABSTRACT

An applicator system roll for direct or indirect application of a coating medium onto a traveling fiber material web includes a core substantially comprised of a fiber composite material and a cover substantially surrounding the core.

8 Claims, 3 Drawing Sheets

APPLICATOR SYSTEM ROLL

This is a continuation of application Ser. No. 09/014,474, filed Jan. 28, 1998, now U.S. Pat. No. 5,967,035.

BACKGROUND OF THE INVENTION

1. Field of the invention.

The present invention relates to a roll for applicator systems for application of a medium onto a traveling material web, notably a paper or cardboard web.

2. Description of the related art.

A roll for applicator systems for application of a medium onto a traveling material web is known, e.g., from the German Patent Document No. DE 40 22 334 C2. This patent document describes a method for operation of an applicator and also illustrates an applicator roll possessing a supporting metal core with a polyurethane cover.

Known from the German Patent Document No. DE 296 09 007 U1 is a printing press roll that also features a metallic core as a support element and possesses a cover of fiber composite material.

Due to their structure with a heavy metal core, such rolls have a large inertia and, therefore, in order to achieve short start-up times, require large drive motors and heavy moving elements. Besides, due to an asymmetric structure of the roll or of the metal pipe used (e.g., due to blowhole inclusion) or due to manufacturing inaccuracies, the roll frequently fails to run smoothly, which is difficult to master by balancing. Such unstable rotation of the roll results, especially with elevated quality demands, in a non-uniform coating profile in the machine direction.

These roll configurations today achieve balance ratings of $Q=1.6$ up to possibly $Q=1.0$ with running truths up to $50 \mu m$ when taking particular measures.

SUMMARY OF THE INVENTION

The present invention provides an applicator system roll whose smooth running is improved over prior rolls.

Accordingly, the inventors have recognized the favorableness of making the core of a roll from fiber composite material, such as glass-fiber-reinforced plastic (GFRP) or carbon-fiber-reinforced plastic (CFRP).

This roll structure leads advantageously to a considerable weight reduction of the roll and, thereby, to lower unbalance forces. Thus, peripheral speeds above 1800 m/min and roll widths over 8 meters can be achieved at unchanged balance rating.

Moreover, the better weight-stability ratio of the fiber composite material considerably reduces the roll flexure that is caused by its dead weight and/or by temperature effects. Besides, such a roll tends considerably less to inherent vibrations than a roll with a metal core, due to the smaller mass and the better damping properties of the fiber composite material. Overall, the above advantages result in an appreciably better and uniform coating profile.

Further advantages of the low weight are that the support structures become more lightweight and low cost, the drive units can be sized down and/or shorter start-up times are achievable.

Furthermore, the structure of a roll of such material can be configured such that the ambient temperature does not have an effect, or at least a very minor one, on the roll diameter. Avoided, in particular, is the so-called "thermal barreling," i.e., a roll expansion that increases from the ends toward the center. Given thereby is also the option of forgoing a cooling of the roll, which is customary with the prior art.

Depending on their use in the coater as an applicator roll, backing roll, transfer roll or speed sizer roll, the above rolls can be made with different covers or of solid fiber composite plastic. A rubber or polyurethane cover has the additional advantage that the adhesion characteristics of rubber or polyurethane on the fiber composite material are better than those of metal, so that cover separations from the core are more seldom than with the prior art.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
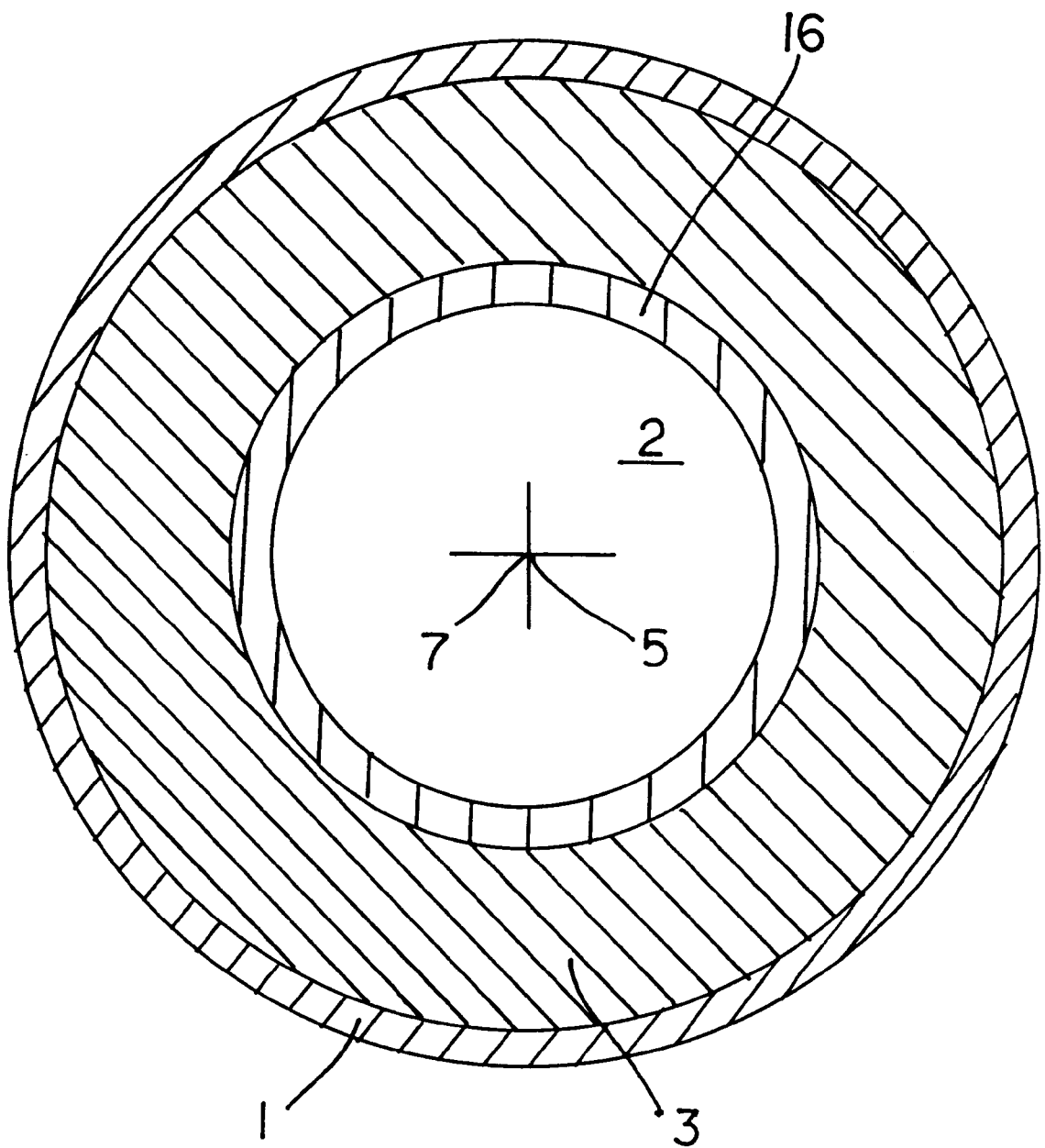
FIG. 1 is a cross-sectional view of one embodiment of a roll for an applicator system of the present invention.

Referring now to the drawings and particularly to FIG. 1, there is shown a cross section of an applicator roll according to one embodiment of the invention. The roll includes a core 3 enclosing a central cavity or hollow interior 2 which is substantially coaxial with an axis of rotation 5. Core 3 is made of fiber composite material, for example carbon-fiber-reinforced plastic (CFRP) or glass-fiber-reinforced plastic (GFRP). The core 3 is enclosed by a cover 1 formed, e.g., of rubber, polyurethane or metal (e.g., a chrome layer).

The roll of FIG. 1 typically has a balance rating of $Q \leq 1.0$. The roll also typically has at operating speed a running truth of $\leq 50 \mu m$ in the roll's longitudinal center 7.

Figure 2:
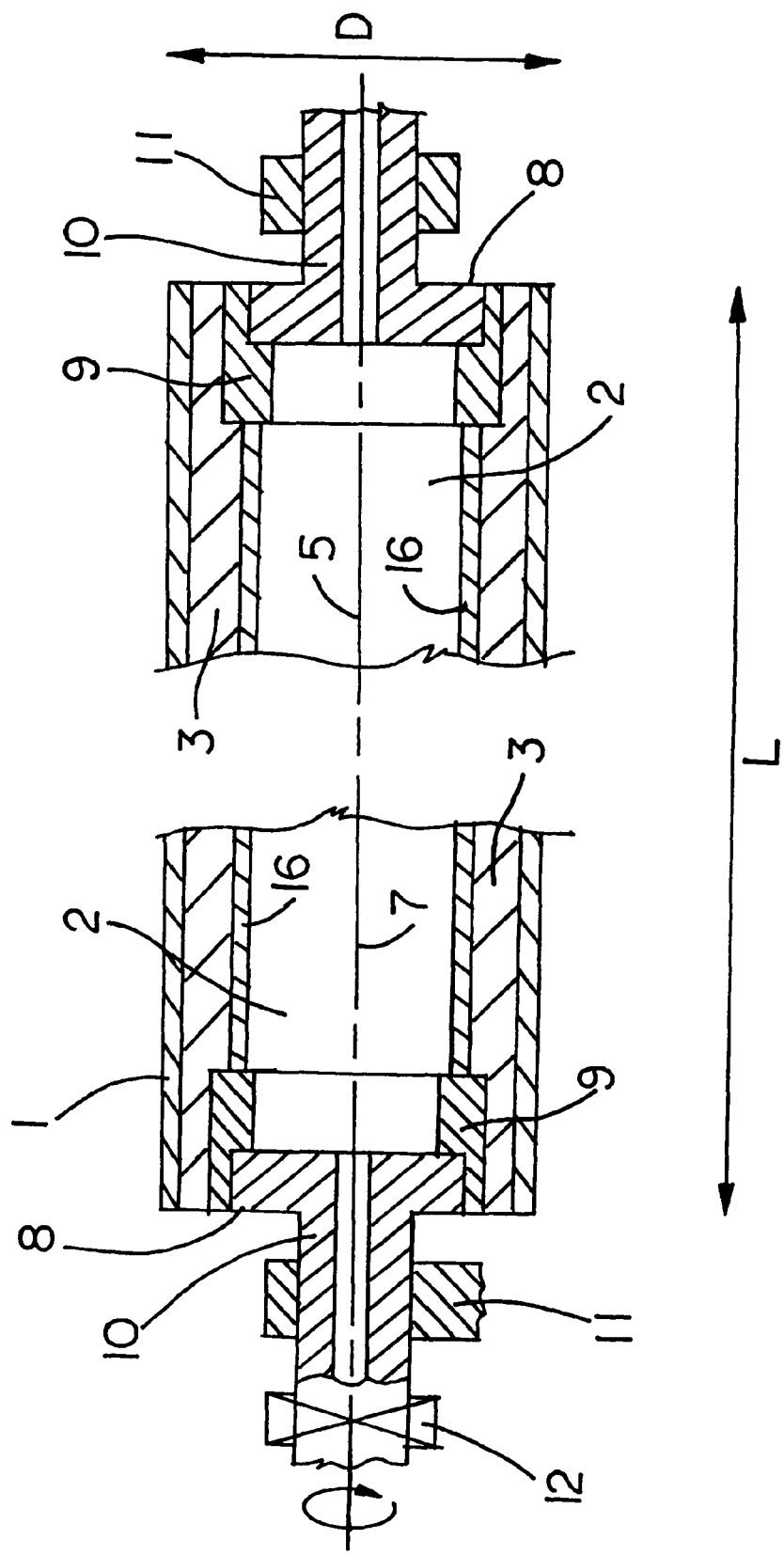
FIG. 2 is a front view of the roll of FIG. 1.

The fiber composite material of core 3 can be configured such that temperature changes will lead to a change in a length L (FIG. 2) of the roll but will not lead to a change in a diameter d of the roll. Alternatively, core 3 can be configured such that temperature changes will lead to a change in diameter d but not to a change in length L.

The roll may be equipped on its ends or bearing area 8 with metal reinforcements 9, to which attach a bearing shaft 10. Coupled to bearing shaft 10 is a bearing 11 and, as the case may be, a drive 12.

The manufacture of core 3 of fiber composite material may necessitate providing in the center an additional thin substrate 16 of selected material, on which the composite plastic is applied with the aid of the known filament winding process. Depending on the manufacturing process, substrate 16 remains bonded to core 3 or is removed later. As clearly shown in the drawings, each of cover 1, core 3 and substrate 16 are of a monolithic, unitary construction.

Figure 3:
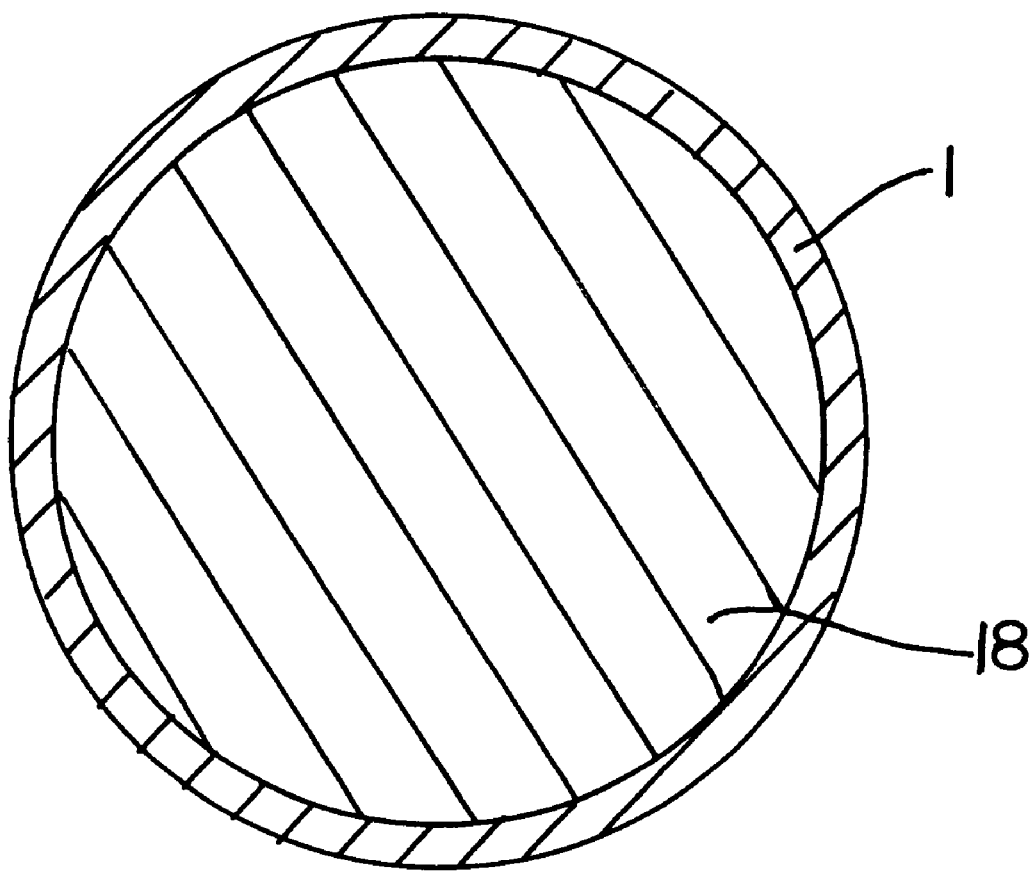
FIG. 3 is a cross-sectional view of another embodiment of a roll for an applicator system of the present invention.

Another embodiment of an applicator roll of the present invention is shown in FIG. 3. The roll includes a substantially solid and cylindrical body 18 formed of fiber composite material. Body 18 is surrounded by a cover 1 substantially identical to that of FIG. 1.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An applicator system roll for one of direct and indirect application of a coating medium onto a traveling fiber material web, said applicator system roll comprising:

a monolithic, unitary core substantially comprised of a fiber composite material, said core having an inner surface defining a central cavity, said central cavity and an axis of rotation of the roll being substantially coaxial; and a monolithic, unitary cover substantially surrounding and directly contacting said core, said cover being configured for applying the coating medium;

wherein said roll has a longitudinal center and a running truth at operating speed of not greater than 50 $\mu$m in said longitudinal center.

2. The applicator system roll of claim 1, wherein said cover is comprised of at least one of rubber and polyurethane.

3. The applicator system roll of claim 1, wherein said cover comprises a metal layer.

4. The applicator system roll of claim 3, wherein said metal layer comprises a chrome layer.

5. The applicator system roll of claim 1, wherein said roll includes a bearing area having a plurality of metal reinforcements.

6. The applicator system roll of claim 1, wherein said fiber composite material comprises at least one of glass-fiber-reinforced plastic and carbon-fiber-reinforced plastic.

7. The applicator system roll of claim 1, wherein said roll has a Q balance rating of not greater than 1.0.

8. The applicator system roll of claim 1, wherein said cover is formed of metal.

* * * * *

UNITED STATES PATENT AND TRADEMARK OFFICE
CERTIFICATE OF CORRECTION

PATENT NO. : 6,202,557 B1
DATED : March 20, 2001
INVENTOR(S) : Martin Kustermann It is certified that error appears in the above-identified patent and that said Letters Patent is hereby corrected as shown below:

Column 1,
Line 1, delete "474" and substitute -- 774 -- therefor.

Signed and Sealed this

Eleventh Day of December, 2001

*Attest:*

*Attesting Officer*

NICHOLAS P. GODICI
*Acting Director of the United States Patent and Trademark Office*